US012786415B2

(12) United States Patent
Leleannec et al.

(10) Patent No.: US 12,786,415 B2
(45) Date of Patent: Nov. 3, 2026

(54) METHOD AND APPARATUS OF PREDICTING BLOCK OF VIDEO PICTURE, AND STORAGE MEDIUM

(71) Applicant: Beijing Xiaomi Mobile Software Co., Ltd., Beijing (CN)

(72) Inventors: Fabrice Leleannec, Beijing (CN); Pierre Andrivon, Beijing (CN); Milos Radosavljevic, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/880,787

(22) PCT Filed: Apr. 24, 2023

(86) PCT No.: PCT/CN2023/090438
§ 371 (c)(1),
(2) Date: Jan. 2, 2025

(87) PCT Pub. No.: WO2024/007696
PCT Pub. Date: Jan. 11, 2024

(65) Prior Publication Data

US 2026/0006209 A1 Jan. 1, 2026

(30) Foreign Application Priority Data

Jul. 5, 2022 (EP) .................................... 22306005

(51) Int. Cl.
*H04N 19/137* (2014.01)
*H04N 19/159* (2014.01)
*H04N 19/176* (2014.01)

(52) U.S. Cl.
CPC ......... *H04N 19/137* (2014.11); *H04N 19/159* (2014.11); *H04N 19/176* (2014.11)

(58) Field of Classification Search
CPC ... H04N 19/137; H04N 19/159; H04N 19/176
(Continued)

(56) References Cited

U.S. PATENT DOCUMENTS 10,567,772 B2 * 2/2020 Xu ....................... H04N 19/137
11,711,511 B2 * 7/2023 Xu ......................... H04N 19/11
375/240.02

(Continued)

OTHER PUBLICATIONS

Chen, H. et al., "Improvements on Intra Block Copy in Natural Content Video Coding", 2015 IEEE International Symposium on Circuits and Systems (ISCAS), IEEE, May 24, 2015, pp. 2772-2275, 4 pages.

(Continued)

*Primary Examiner* — Matthew David Kim
(74) *Attorney, Agent, or Firm* — Finnegan, Henderson, Farabow, Garrett & Dunner, L.L.P.

(57) ABSTRACT

A method of predicting a block of a video picture, includes: deriving a first prediction block from an intra-template-matching prediction mode determining the first prediction block by minimizing a cost function calculated between sample values of a L-shaped template of the block of the video picture and a L-shaped template of a reconstructed block of the video picture; and determining a first block vector as a displacement between the first prediction block and the block of the video picture, the first block vector identifying the first prediction block as a prediction block candidate of the block of the video picture.

19 Claims, 9 Drawing Sheets

(58) Field of Classification Search
USPC ...................................................... 375/240.02
See application file for complete search history.

(56) References Cited

U.S. PATENT DOCUMENTS

| | | | | |
|---|---|---|---|---|
| 2015/0146775 | A1* | 5/2015 | Lee | H04N 19/139 375/240.02 |
| 2015/0350684 | A1* | 12/2015 | Takahashi | H04N 19/176 375/240.12 |
| 2017/0048539 | A1* | 2/2017 | Kim | H04N 19/61 |
| 2018/0376149 | A1* | 12/2018 | Zhang | H04N 19/463 |
| 2018/0376164 | A1* | 12/2018 | Zhang | H04N 19/196 |
| 2020/0014934 | A1 | 1/2020 | Xu et al. | |
| 2020/0204819 | A1* | 6/2020 | Hsieh | H04N 19/513 |
| 2020/0389653 | A1* | 12/2020 | Jang | H04N 19/147 |
| 2021/0344932 | A1* | 11/2021 | Jang | H04N 19/159 |
| 2022/0150471 | A1* | 5/2022 | Bae | H04N 19/105 |
| 2022/0182604 | A1* | 6/2022 | Kim | H04N 19/105 |
| 2022/0191472 | A1* | 6/2022 | Park | H04N 19/137 |
| 2022/0279163 | A1* | 9/2022 | Park | H04N 19/105 |
| 2022/0311997 | A1* | 9/2022 | Huang | H04N 19/105 |
| 2023/0113104 | A1* | 4/2023 | Li | H04N 19/593 375/240.12 |

OTHER PUBLICATIONS

Naser, K. et al., "EE2: Intra Template Matching", InterDigital., Joint Video Experts Team (JVET) of ITU-T SG 16 WP 3 and ISO/IEC JTC 1/SC 29, Document: JVET-V0130-v6, Apr. 20-28, 2021, 7 pages.

Extended European Search Report Issued in Application No. 22306005.4 dated Dec. 15, 2022, 9 pages.

ISA China National Intellectual Property Administration, Written Opinion of the International Searching Authority Issued in Application No. PCT/CN2023/090438, Jul. 21, 2023, WIPO, 7 pages.

* cited by examiner

METHOD AND APPARATUS OF PREDICTING BLOCK OF VIDEO PICTURE, AND STORAGE MEDIUM

CROSS-REFERENCE TO RELATED APPLICATIONS

This application is a U.S. national phase of International Application No. PCT/CN2023/090438, filed on Apr. 24, 2023, which is based on and claims priority to European Patent Application No. 22306005.4, filed on Jul. 5, 2022, the entire content of both of which is incorporated herein by reference.

FIELD

The present application generally relates to video picture encoding and decoding. Particularly, but not exclusively, the technical field of the present application is related to intra-template-matching based prediction of a video picture block.

BACKGROUND

The present section is intended to introduce the reader to various aspects of art, which may be related to various aspects of at least one exemplary embodiment of the present application that is described and/or claimed below. This discussion is believed to be helpful in providing the reader with background information to facilitate a better understanding of the various aspects of the present application. Accordingly, it should be understood that these statements are to be read in this light, and not as admissions of prior art.

In the state-of-the-art video compression systems such as HEVC (ISO/IEC 23008-2 High Efficiency Video Coding, ITU-T Recommendation H.265, https://www.itu.int/rec/T-REC-H.265-202108-P/en) or VVC (ISO/IEC 23090-3 Versatile Video Coding, ITU-T Recommendation H.266, https://www.itu.int/rec/T-REC-H.266-202008-I/en, low-level and high-level picture partitioning are provided to divide a video picture into picture areas so-called Coding-Tree Units (CTU) which size may be typically between 16×16 and 64×64 pixels for HEVC and 32×32, 64×64, or 128×128 pixels for VVC.

The CTU division of a video picture forms a grid of fixed size CTUs, namely a CTU grid, which upper and left bounds spatially coincide with the top and left borders of the video picture. The CTU grid represents a spatial partition of the video picture.

SUMMARY

The following section presents a simplified summary of the at least one exemplary embodiment in order to provide a basic understanding of some aspects of the present application. This summary is not an extensive overview of an exemplary embodiment. It is not intended to identify key or critical elements of an exemplary embodiment. The following summary merely presents some aspects of the at least one exemplary embodiment in a simplified form as a prelude to the more detailed description provided elsewhere in the document.

According to a first aspect of the present application, there is provided a method of predicting a block of a video picture, wherein a first prediction block is derived from an intra-template-matching prediction mode determining said first prediction block by minimizing a cost function calculated between sample values of a L-shaped template of the block of the video picture and a L-shaped template of a reconstructed block of the video picture, wherein the method further comprises determining a first block vector as a displacement between the first prediction block and the block of the video picture, said first block vector identifying the first prediction block as a prediction block candidate of the block of the video picture.

According to a second aspect of the present application, there is provided a method of encoding a block of a video picture based on a predicted block derived from a method according to the fist aspect.

According to a third aspect of the present application, there is provided a method of decoding a block of a video picture based on a predicted block derived from a method according to the first aspect.

According to a fourth aspect of the present application, there is provided an apparatus comprising means for performing one of the method according to the first, second and/or third aspect.

According to a fifth aspect of the present application, there is provided a non-transitory storage medium carrying instructions of program code for executing a method according to the first, second and/or third aspect.

The specific nature of at least one of the exemplary embodiments as well as other objects, advantages, features and uses of said at least one of exemplary embodiments will become evident from the following description of examples taken in conjunction with the accompanying drawings.

BRIEF DESCRIPTION OF THE DRAWINGS

Reference will now be made, by way of example, to the accompanying drawings which show exemplary embodiments of the present application, and in which.

DESCRIPTION OF EXEMPLARY EMBODIMENTS

Exemplary embodiments are described in detail hereinafter with reference to the accompanying figures, in which examples of the exemplary embodiments are depicted. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the present application is intended to cover all modifications, equivalents, and alternatives falling within the spirit and scope of the present application.

In VVC and HEVC, the CTU size (CTU width and CTU height) of all the CTUs of a CTU grid equals a same default CTU size (default CTU width CTU DW and default CTU height CTU DH). For example, the default CTU size (default CTU height, default CTU width) may equal to 128 (CTU DW=CTU DH=128). A default CTU size (height, width) is encoded into the bitstream, for example at a sequence level in the Sequence Parameter Set (SPS).

The spatial position of a CTU in a CTU grid is determined from a CTU address ctuAddr defining a spatial position of the top-left corner of a CTU from an origin. As illustrated on FIG. 1, the CTU address may define the spatial position from the top-left corner of a higher-level spatial structure S containing the CTU.

A coding tree is associated with each CTU to determine a tree-division of the CTU.

Figure 1:
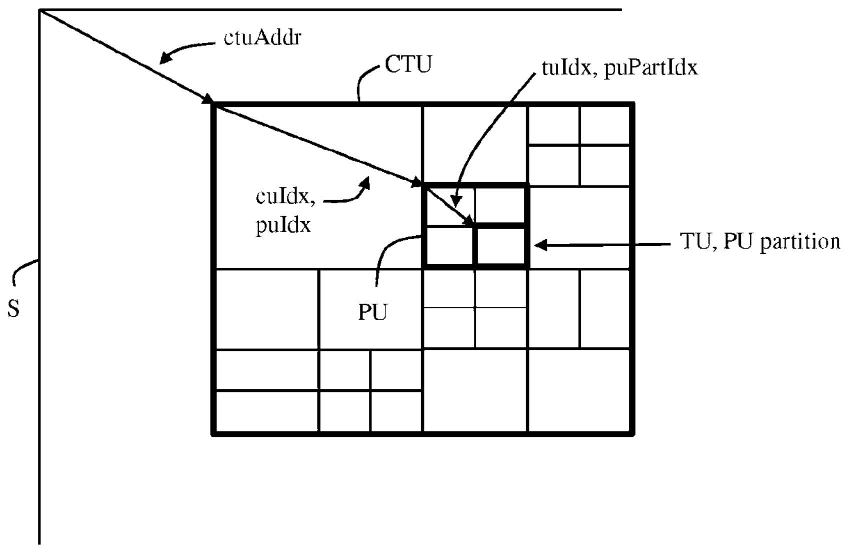
FIG. 1 shows an example of coding-tree unit in accordance with HEVC.

As illustrated on FIG. 1, in HEVC, the coding tree is a quad-tree division of a CTU, where each leaf is called a Coding Unit (CU). The spatial position of a CU in the video picture is defined by a CU index culdx indicating a spatial position from the top-left corner of the CTU. A CU is spatially partitioned into one or more Prediction Units (PU). The spatial position of a PU in the video picture VP is defined by a PU index puIdx defining a spatial position from the top-left corner of the CTU and the spatial position of an element of a partitioned PU is defined by a PU partition index puPartIdx defining a spatial position from the top-left corner of a PU. Each PU is assigned some intra or inter prediction data.

The coding mode intra or inter is assigned on the CU level. That means that a same intra/inter coding mode is assigned to each PU of a CU, though the prediction parameters varying from PU to PU.

A CU may be also spatially partitioned into one or more Transform Units (TU), according to a quad-tree called the transform tree. Transform Units are the leaves of the transform tree. The spatial position of a TU in the video picture is defined by a TU index tuIdx defining a spatial position from the top-left corner of a CU. Each TU is assigned some transform parameters. The transform type is assigned on the TU level, and 2D separate transform is performed at TU level during the coding or decoding of a picture block.

Figure 2:
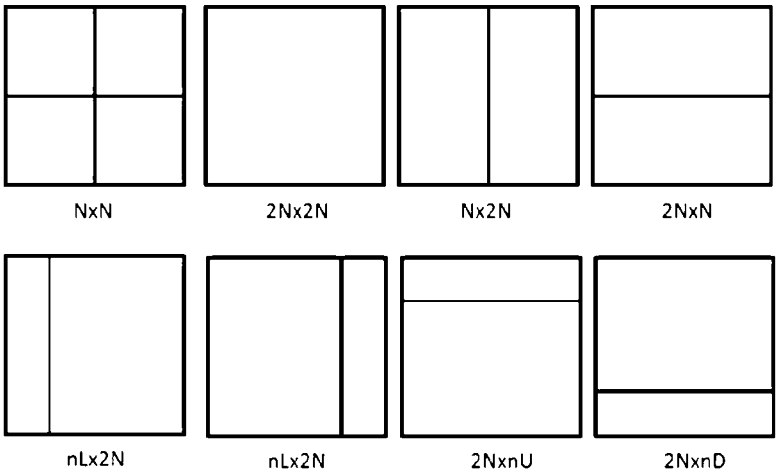
FIG. 2 shows an example of partitioning coding units into prediction units in accordance with HEVC.

The PU Partition types existing in HEVC are illustrated on FIG. 2. They include square partitions (2N×2N and N×N), which are the only ones used in both Intra and Inter predicted CUs, symmetric non-square partitions (2N×N, N×2N, used only in Inter predicted CUs), and asymmetric Partitions (used only in Inter predicted CUs). For instance, the PU type 2N×nU stands for an asymmetric horizontal partitioning of the PU, where the smaller partition lies on the top of the PU. According to another example, PU type 2N×nL stands for an asymmetric horizontal partitioning of the PU, where the smaller partition lies on the top of the PU.

Figure 3:
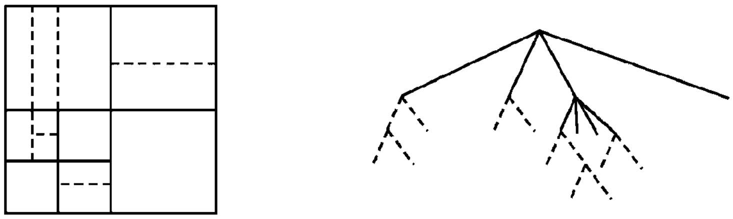
FIG. 3 shows an example of a CTU division in accordance with VVC.
Figure 4:
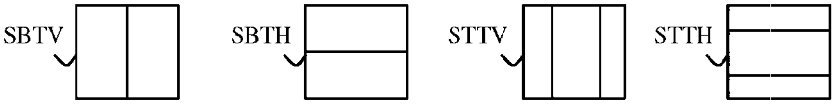
FIG. 4 shows examples of split modes supported in the multi-type tree partitioning in accordance with VVC.

As illustrated on FIG. 3, in VVC, the coding tree starts from a root node, i.e. the CTU. Next, a quad-tree (or quaternary tree) split divides the root node into 4 nodes corresponding to 4 sub-blocks of equal sizes (solid lines). Next, the quaternary tree (or quad-tree) leaves can then be further partitioned by a so-called multi-type tree, which involves a binary or ternary split according to one of 4 split modes illustrated on FIG. 4. These split types are the vertical and horizontal binary split modes, noted SBTV and SBTH and the vertical and horizontal ternary split modes SPTTV and STTH.

The leaves of the coding tree of a CTU are CU in the case of a joint coding tree shared by luma and chroma components.

Contrary to HEVC, in VVC, in most cases, CU, PU and TU have equal size, which means coding units are generally not partitioned into PU or TU, except in some specific coding modes.

Figure 5:
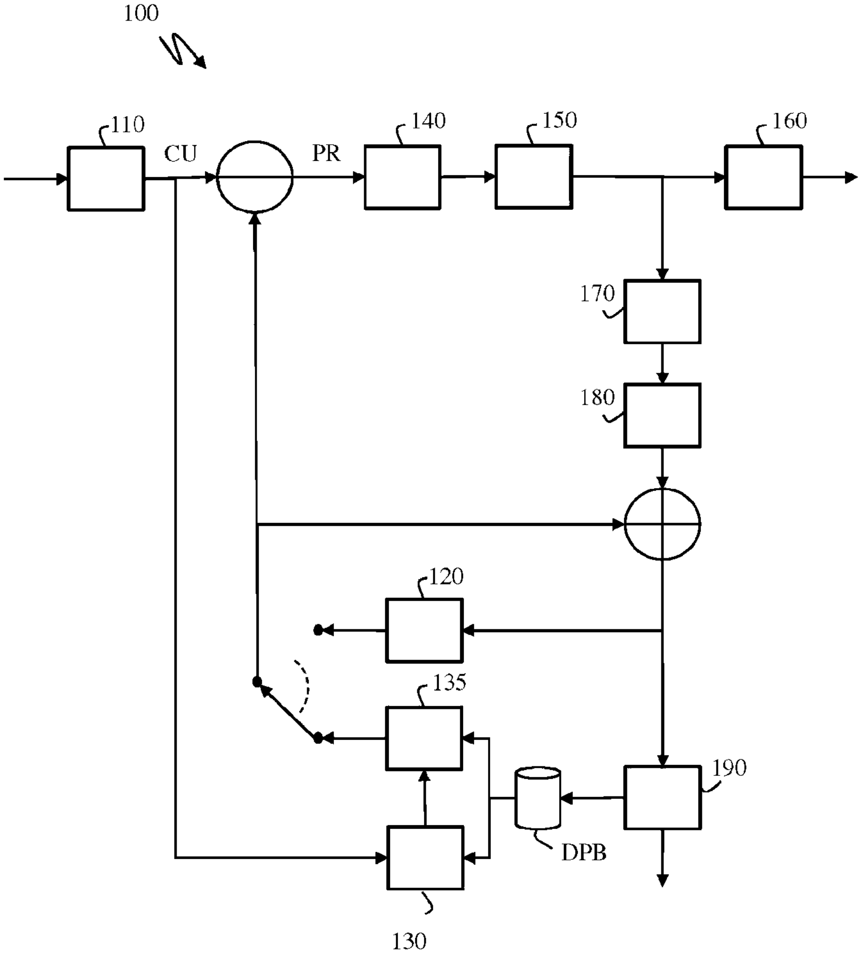
FIG. 5 shows a schematic block diagram of steps of a method 100 of encoding a video picture VP in accordance with prior art.
Figure 6:
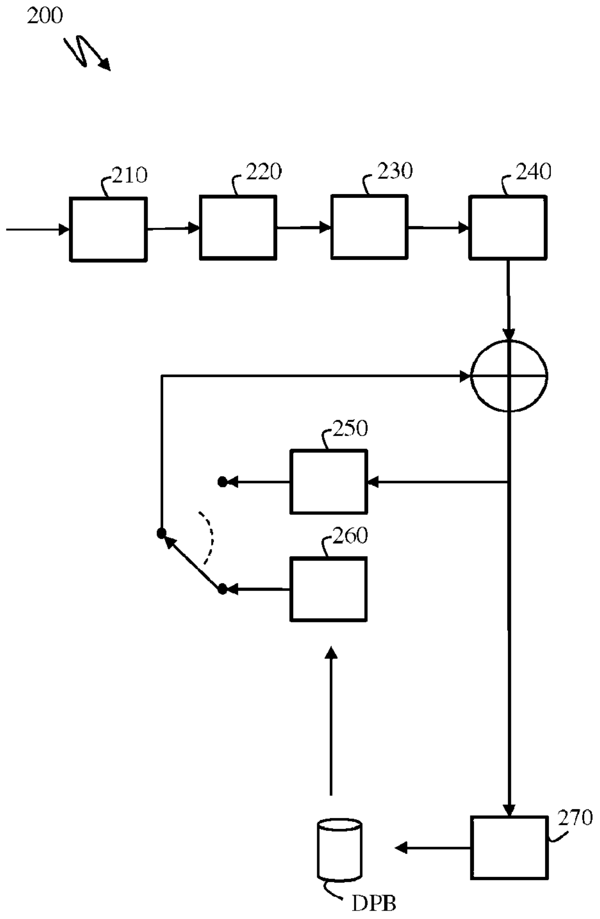
FIG. 6 shows a schematic block diagram of steps of a method 200 of decoding a video picture VP in accordance with prior art.

FIGS. 5 and 6 provide an overview of video encoding/decoding methods used in current video standard compression systems like HEVC or VVC for example.

FIG. 5 shows a schematic block diagram of steps of a method 100 of encoding a video picture VP in accordance with prior art.

In step 110, a video picture VP is partitioned into blocks of samples and partitioning information data is signaled into a bitstream. Each block comprises samples of one component of the video picture VP. The blocks thus comprise samples of each component defining the video picture VP.

For example, in HEVC, a picture is divided into Coding Tree Units (CTU). Each CTU may be further subdivided using a quad-tree division, where each leaf of the quad-tree is denoted a Coding Unit (CU). The partitioning information data may then comprise data describing the CTU and the quad-tree subdivision of each CTU.

Each block of samples, in short block, may then be either a CU (if the CU comprises a single PU) or a PU of a CU.

Each block is encoded along an encoding loop also called "in loop" using either an intra or inter prediction mode.

Intra prediction (step 120) used intra prediction data. Intra prediction consists in predicting a current block by means of an intra-predicted block based on already encoded, decoded and reconstructed samples located around the current block, typically on the top and on the left of the current block. Intra prediction is performed in the spatial domain.

In inter-prediction mode, motion estimation (step 130) and motion compensation (135) are performed. Motion estimation searches, in one or more reference video picture(s) used to predictively encode the current video picture, a candidate reference block that is a good predictor of the current block. For instance, a good predictor of the current block is a predictor which is similar to the current block. The output of the motion estimation step 130 is inter-prediction data comprising motion information (typically one or more motion vectors and one or more reference video picture indices) associated to the current block and other information used for obtaining a same predicted block at the encoding/decoding side. Next, motion compensation (step 135) obtains a predicted block by means of the motion vector(s) and reference video picture index (indices) determined by the motion estimation step 130. Basically, the block belonging to a selected reference video picture and pointed to by a motion vector may be used as the predicted block of the current block. Furthermore, since motion vectors are expressed in fractions of integer pixel positions (which is known as sub-pel MV accuracy representation), motion compensation generally involves a spatial interpolation of some reconstructed samples of the reference video picture to compute the predicted block.

Prediction information data is signaled into the bitstream. The prediction information may comprise prediction mode, intra/inter prediction data and any other information used for obtaining a same predicted CU at the decoding side.

The method 100 selects one prediction mode (the intra or inter prediction mode) by optimizing a rate-distortion tradeoff taking into account the encoding of a prediction residual block calculated, for example, by subtracting a candidate predicted block from the current block, and the signaling of prediction information data required for determining said candidate predicted block at the decoding side.

Usually, the best prediction mode is given as being the prediction mode of a best coding mode p* for a current block given by:

$$p* = \underset{p \in P}{\text{Argmin}} \{RD_{cost}(p)\} \qquad (1)$$

where P is the set of all candidate coding modes for the current block, p represents a candidate coding mode in that set, $RD_{cost}(p)$ is a rate-distortion cost of candidate coding mode p, typically expressed as:

$$RD_{cost(p)} = D(p) + \lambda \cdot R(p)$$

D(p) is the distortion between the current block and a reconstructed block obtained after encoding/decoding the current block with the candidate coding mode p, R(p) is a rate cost associated with the coding of the current block with coding mode p, and λ is the Lagrange parameter representing the rate constraint for coding the current block and typically computed from a quantization parameter used for encoding the current block.

The current block is usually encoded from a prediction residual block PR. More precisely, a prediction residual block PR is calculated, for example, by subtracting the best predicted block from the current block. The prediction residual block PR is then transformed (step 140) by using, for example, a DCT (discrete cosine transform) or DST (Discrete Sinus transform) type transform, or any other appropriate transform, and the obtained transformed coefficient block is quantized (step 150).

In variant, the method 100 may also skip the transform step 140 and apply quantization (step 150) directly to the prediction residual block PR, according to the so-called transform-skip coding mode.

Quantized transform coefficient block (or quantized prediction residual block) is entropy encoded into the bitstream (step 160).

Next, the quantized transform coefficient block (or the quantized residual block) is de-quantized (step 170) and inverse transformed (180) (or not) as part of the encoding loop, leading to a decoded prediction residual block. The decoded prediction residual block and the predicted block are then combined, typically summed, which provides the reconstructed block.

Other information data may also be entropy encoded in step 160 for encoding a current block of the video picture VP.

In-loop filters (step 190) may be applied to a reconstructed picture (comprising reconstructed blocks) to reduce compression artefacts. Loop filters may apply after all picture blocks are reconstructed. For instance, they consist in deblocking filter, Sample Adaptive Offset (SAO) or adaptive loop filter.

The reconstructed blocks or the filtered reconstructed blocks form a reference picture that may be stored into a decoded picture buffer (DPB) so that it can be used as a reference picture for the encoding of a next current block of the video picture VP, or of a next vide picture to encode.

FIG. 6 shows a schematic block diagram of steps of a method 200 of decoding a video picture VP in accordance with prior art.

In step 210, partitioning information data, prediction information data and quantized transform coefficient block (or quantized residual block) are obtained by entropy decoding a bitstream of encoded video picture data. For instance, this bitstream has been generated in accordance with the method 100.

Other information data may also be entropy decoded for decoding from the bitstream a current block of the video picture VP.

In step 220, a reconstructed picture is divided into current blocks based on the partitioning information. Each current block is entropy decoded from the bitstream along a decoding loop also called "in loop". Each decoded current block is either a quantized transform coefficient block or quantized prediction residual block.

In step 230, the current block is de-quantized and possibly inverse transformed (step 240), to obtain a decoded prediction residual block.

On the other hand, the prediction information data is used to predict the current block. A predicted block is obtained through its intra prediction (step 250) or its motion-compensated temporal prediction (step 260). The prediction process performed at the decoding side is identical to that of the encoding side.

Next, the decoded prediction residual block and the predicted block are then combined, typically summed, which provides a reconstructed block.

In step 270, in-loop filters may apply to a reconstructed picture (comprising reconstructed blocks) and the reconstructed blocks or the filtered reconstructed blocks form a reference picture that may be stored into a decoded picture buffer (DPB) as above discussed (FIG. 5).

In step 130/135 of FIG. 5 or step 260 of FIG. 6, an inter-predicted block is defined from inter-prediction data associated with the current block (CU or a PU of a CU) of a video picture. This inter-prediction data comprises motion information that may be represented (coded) according to the so-called AMVP mode (Adaptive Motion Vector Prediction) or the so-called merge mode.

In HEVC, in the AMVP mode, the motion information used to define an inter-predicted block is represented by up-to 2 reference video picture indices respectively associated to up-to 2 reference video picture lists usually denoted L0 and L1. The reference video picture reference list L0 comprises at least one reference video picture and the reference video picture reference list L1 comprises at least one reference video picture. Each reference video picture index is relative to a temporal prediction of the current block. The motion information further comprises up-to 2 motion vectors, each associated with a reference video picture index of one of the two reference video picture lists. Each motion vector is predictively encoded and signaled into the bitstream, i.e. one motion vector difference MVd is derived from the motion vector and one AMVP (Adaptative Motion Vector Predictor) candidate selected from a AMVP candidate list (built at the encoding and decoding side) and MVd is signaled into the bitstream. The AMVP candidate index of a selected AMVP candidate in the AMVP candidate list is also signaled in the bitstream.

Figure 7:
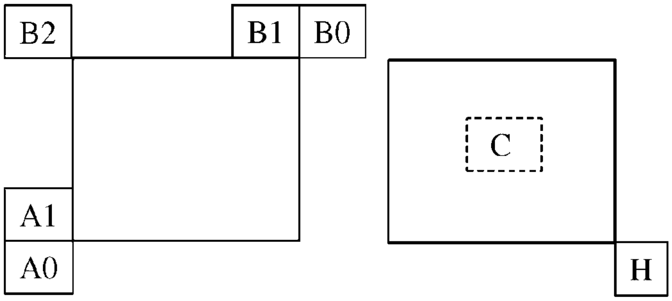
FIG. 7 shows an illustrative example for building a AMVP candidate list used to define an inter-predicted block of a current block of a current video picture.

FIG. 7 shows an illustrative example for building a AMVP candidate list used to define an inter-predicted block of a current block of a current video picture.

The AMVP candidate list may comprise two spatial MVP (Motion Vector Predictor) candidates that are derived from the current video picture. A first spatial MVP candidate is derived from motion information associated with inter-predicted blocks, if exist, located at left neighboring positions A0, A1 of the current block, and a second MVP candidate is derived from motion information associated with inter-predicted blocks, if exist, located at top neighboring positions B0, B1 and B2 of the current block. A redundancy check is then conducted between derived spatial MVP candidates, i.e. duplicate derived MVP candidates are discarded. The AMVP candidate list may further comprise a temporal MVP candidate that is derived from motion information associated with a co-located block, if exits, in the reference video picture at spatial position H, or at spatial position C otherwise. The temporal MVP candidate is scaled according to the temporal distances between the current video picture and the reference video picture. Finally, if the AMVP candidate list comprises less than 2 MVP candidates then the AMVP candidate list is padded with zero motion vectors.

In HEVC, in the merge mode, the motion information used to define an inter-predicted block is represented by one merge index of a merge MVP candidate list. Each merge index refers to motion predictor information that indicates which MVP is used to derive the motion information. The motion information is represented by one uni-directional or bi-directional temporal prediction type, up-to 2 reference video picture indices and up-to 2 motion vectors, each associated with a reference video picture index of one of the two reference video picture lists (L0 or L1).

No other information is signaled apart from the merge index. This means the motion vector of current block is set equal to that of the MVP candidate indicated by the merge index. Therefore, as opposed to the merge mode, no MVd and no reference picture index is signaled into the bitstream. Only the index of a selected merge candidate in the merge candidate list is also signaled in the bitstream.

Therefore, as opposed to the AMVP mode, no MVd and no reference picture are signaled in the merge mode. Only the merge index is signaled into the bitstream.

The merge MVP candidate list may comprise five spatial MVP candidates that are derived from the current video picture as illustrated on FIG. 7. A first spatial MVP candidate is derived from motion information associated with an inter-predicted block, if exists, located at left neighboring position A1, a second spatial MVP candidate is derived from motion information associated with an inter-predicted block, if exists, located at above neighboring position B1, a third spatial MVP candidate is derived from motion information associated with an inter-predicted block, if exists, located at above-right neighboring position B0, a forth spatial MVP candidate is derived from motion information associated with an inter-predicted block, if exists, located at left-bottom neighboring position A0 and a fifth spatial MVP candidate is derived from above motion associated with an inter-predicted blocks, if exists, located at left neighboring position B2. A redundancy check is then conducted between derived spatial MVPs, i.e. duplicate derived MVP candidates are discarded. The merge candidate list may further comprise a temporal MVP candidate, named TMVP candidate, that is derived from motion information associated with a co-located block, if exists, in the reference video picture at position H, or at center spatial position "C" otherwise. A redundancy check is then conducted between derived spatial MVPs, i.e. duplicate derived MVP candidates are discarded. Finally, when bi-directional temporal prediction type is used, if the merge candidate list comprises less than 5 MVP candidates, then a combined candidate is added to the merge candidate list. A combined candidate is derived from motion information associated to one reference video picture list and relative to one MVP candidate already present in the merge candidate list, with the motion information associated to another reference video picture list and relative to another MVP candidate already present in the merge candidate list. Finally, if the merge candidate list is still not full (5 merge candidates) then the merge candidate list is padded with zero motion vectors.

Figure 8:
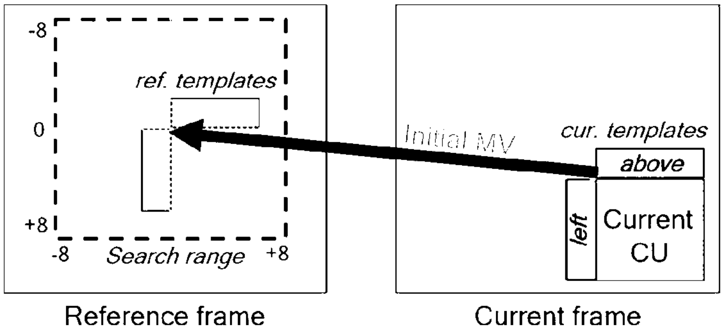
FIG. 8 shows an example of template matching method in accordance with prior art.

In ECM ("Algorithm description of Enhanced Compression Model 4 (ECM 4)", M. Coban, F. Le Léannec, K. Naser, J. Ström, Joint Video Experts Team (JVET) of ITU-T SG 16 WP 3 and ISO/IEC JTC 1/SC 29, 23rd Meeting, by teleconference, 7-16 Jul. 2021, Document JVET-Y202-v2, https://jvet-experts.org/doc_end_user/documents/25_Teleconference/wg11/JVET-Y2025-v2.zip), a Template Matching (TM) method may be used to determine some MVP candidates in AMVP and merge modes. The TM method is a decoder side motion vector refinement method. It refines a block's motion vector by matching a so-called L-shaped template located above and on the left of a current block with a template in a search area of the reference picture as illustrated on FIG. 8. A better MV is searched around the initial MV of current block, for example within a [−8, +8]-pel search range. The refined MV is obtained by minimizing a so-called template matching cost TMcost between a template around current block and candidate templates in reference video picture. The MVP candidate with minimum template matching cost is selected and further refined.

Coding the motion information according to VVC provides a richer representation of motion information than in HEVC.

In VVC, the motion representation may be provided according to either a AMVP mode or a merge mode.

In VVC, in the AMVP mode, the motion information used to define an inter-predicted block is represented as in the HEVC AMVP mode. The AMVP candidate list may comprise spatial and temporal MVP candidates as in HEVC, if exist. The AMVP candidate list may further comprise four additional HMVP (History-Based Motion Vector Prediction) candidates, if exist. Finally, if the AMVP candidate list comprises less than 2 MVP candidates then the AMVP candidate list is padded with zero motion vectors.

HMVP candidates are derived from previously coded MVPs associated with adjacent or non-adjacent blocks relative to the current block. To do so, a table of HMVP candidates is maintained at both encoder and decoder sides and updated on the fly, as a first-in-first-out (FIFO) buffer of MVPs. There are up to five HMVP candidates in the table. After coding one block, the table is updated by appending the associated motion information to the end of the table as a new HMVP candidate. The FIFO rule is applied to manage the table wherein, in addition to the basic FIFO mechanism, the redundant candidate in the HMVP table is firstly removed instead of the first one. The table is reset at each CTU row to enable parallel processing.

The AMVP mode employs AMVR (Adaptive Motion Vector Resolution). The AMVR tool allows signaling the MVds with quarter-pel, half-pel, integer-pel or 4-pel luma sample resolutions. This allows saving bits in the coding of MVd information also. In AMVR, the motion vector resolution is chosen at block level.

Finally, the internal motion vector representation is achieved at 1/16-luma sample accuracy, instead of 1/4-luma sample accuracy in HEVC.

In VVC, in the merge mode, the motion information used to define an inter-predicted block is represented as in the HEVC merge mode.

The merge candidate list is different from the merge candidate list used in HEVC.

In VVC, the merge candidate list may be built for MMVD (Merge Mode with MV Difference) mode or CIIP (Combined Intra/Inter Prediction) mode.

Figure 9:
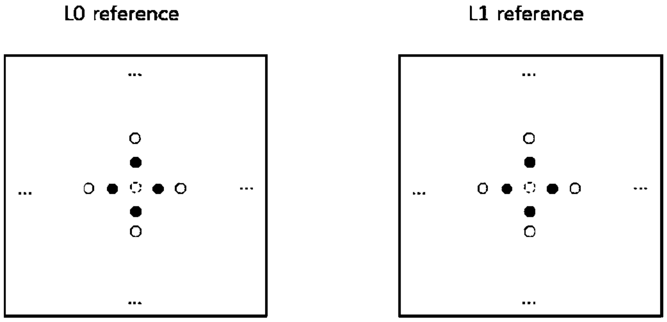
FIG. 9 shows an example of limited motion vector differences in accordance with prior art.

MMVD mode allows coding a limited motion vector difference (MVd) on top of a selected merge candidate, to represent the motion information associated with an inter-predicted block. MMVD coding is limited to 4 vector directions and 8 magnitude values, from 1/4 luma sample to 32-luma sample as illustrated on FIG. 9. MMVD mode provides an intermediate accuracy level, hence an intermediate trade-off between rate cost and MV (Motion Vector) accuracy to signal the motion information. MMVD offsets may also be signaled into a bitstream. Motion vectors are then derived by adding MMVD offsets to MV predictors.

CIIP consists in combining an inter-prediction signal with an intra-prediction signal to predict a current block of a video picture. The inter-prediction signal in the CIIP mode is derived using the same inter-prediction process as applied to merge mode; and the intra-prediction signal is derived following a regular intra-prediction process with a planar mode. The planar prediction mode consists in predicting a block through a spatial interpolation process between reconstructed neighboring samples of the predicted block, located on the top and left of the block. Then, the intra and inter prediction signals are blended (combined) using weighted averaging, where the weight value is calculated depending on the coding modes of the top and left neighbouring blocks:

$$PCIIP = (Wmerge \times Pmerge + Wintra \times Pintra + 2) >> 2$$

The sums of weights $W_{merge}$ and $W_{intra}$ is equal to 4 and these weights are constant in the whole current block.

In summary, in VVC, the merge candidate list may comprise spatial MVP candidates similar to HEVC except the two first candidates are swapped: candidate B1 is considered before candidate A1 during the merge candidate list construction. The merge candidate list may further comprise TMVP similarly to HEVC, HMVP candidates as in the VVC AMVP mode. Several HMVP candidates are inserted into the merge candidate list so that the merge candidate list reaches the maximum allowed number of MVP candidates (minus 1). The merge candidate list may also comprise up-to 1 pairwise average candidates computed as follows: the two first merge candidates present in the merge candidate list are considered and their motion vectors are averaged. This averaging is computed separately for each reference video picture list L0 and L1. So, if both MVP are bi-directional, motion vectors related to both lists L0 and L1 are averaged. If only one motion vector is present in a reference video picture list, it is taken as is to form the pairwise candidate. Finally, if the merge candidate list does not reach the maximum allowed number of MVP candidates, then the merge candidate list is padded with zero motion vectors.

Intra block copy (IBC) prediction mode is used in HEVC and VVC for screen content coding. It is well known that IBC prediction mode significantly improves the coding efficiency of screen content materials. Since IBC prediction mode is implemented as a block level coding mode, block matching (BM) is performed at the encoder to find an optimal block vector (or motion vector) for each block to be predicted. A block vector indicates the displacement from a block to be predicted of a video picture to a reference block, i.e., a prediction block of a reconstructed area of the video picture, which is already reconstructed (decoded) inside said video picture. A block vector of an IBC predicted block of luma samples is in integer precision. A block vector of an IBC predicted block of chroma samples rounds to integer precision as well. When combined with AMVR, the IBC prediction mode can switch between 1-pel and 4-pel motion vector precisions. The IBC prediction mode is treated as the third prediction mode other than intra or inter prediction modes.

At CU level, IBC prediction mode is signalled as prediction information with a flag that indicates either an IBC-AMVP mode or an IBC-skip/merge mode is used.

In the IBC-skip/merge mode, a block vector used to define an IBC predicted block is represented by one merge index indicating an element in a list of block vector prediction candidates (merge candidate list). The merge candidate list may comprise spatial, HMVP, and pairwise block vectors candidates.

HMVP (History-based Motion Vector Prediction) candidates are obtained similarly to the case of classical inter merge coding. The HMVP involved a buffer of block vector (motion vector) candidates which is fed as long as block of the video picture are being predicted by using an IBC prediction mode. The HMVP buffer then consists in a buffer of block vector candidates and is used to provide block vector candidate for predicting a current block of the video picture by using an IBC prediction mode.

A pairwise block vector candidate can be generated by averaging two IBC block vector candidates, i.e. block vectors derived from IBC prediction modes. This means the two first block vector candidates in the merge candidate list under construction are averaged to form a so-called pairwise block vector candidate. This pairwise block vector candidate is added to the merge candidate list after the HMVP candidate.

For HMVP, block vectors are inserted into history buffer for future referencing.

In the IBC-AMVP mode, two block vector are determined, one from left neighbor of the block to be predicted and one from above neighbor of the block to be predicted. When either neighbor is not available, a default block vector is considered. A flag is signaled as prediction information to indicate which block vector is used to predict the block vector of current block. Indeed, since at most 2 block vectors candidates are considered in IBC-AMVP mode, a flag is sufficient to identify the block vector candidate used for the coding of the block vector information. Block vector difference is coded in the same way as a motion vector difference of inter-predicted blocks.

IBC prediction mode cannot be used in combination with inter prediction tools of VVC such as CIIP and MMVD.

In VVC, IBC prediction mode shares the same process as in regular MV merge including with pairwise merge candidate and history-based motion predictor but disallows TMVP and zero vector because they are invalid for IBC prediction mode.

Intra template matching prediction (ITMP) mode is a special intra prediction mode of a current block of a video picture that copies the best prediction block from a reconstructed block of the video picture, whose L-shaped template matches the L-shaped template of a current block to be predicted of a video picture. Basically, for a predefined search range, the encoder searches for the most similar L-shaped template of a reconstructed block of the video picture to the L-shaped template of the current block and uses the corresponding block as the best prediction block. The encoder then signals the usage of ITMP mode as prediction information, and the same prediction operation is performed at the decoder side.

Figure 10:
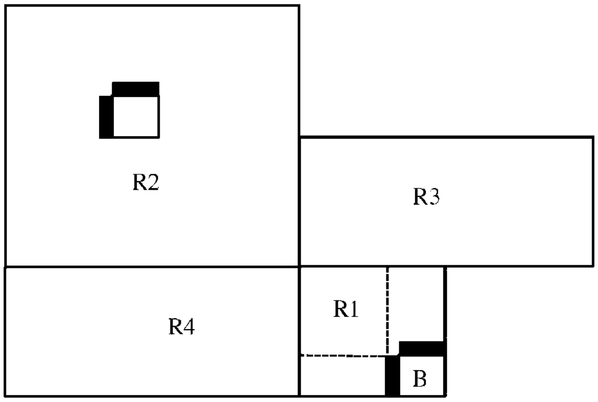
FIG. 10 shows schematically an example of spatial areas used in an ITMP prediction mode in accordance with prior art.

In ECM, the search range comprises four spatial areas R1, R2, R3 and R4 as illustrated on FIG. 10. Area R1 is the current CTU that comprises the current block B to be predicted of the video picture, area R2 is the top-left CTU, R3 is the above CTU and R4 is the left CTU. A cost function is used to evaluate the matching of the L-shaped template of the current block B and the L-shaped template of a prediction block candidate. The best prediction block corresponds to a minimum of said cost function. For example, the cost function calculated between two L-shaped templates is a Sum of Absolute Difference (SAD) between samples of said L (shaped) templates.

The width SearchRange_w and the height SearchRange_h of the areas R1-R3 are set proportional to the width BlkW and the height BlkH of the current block to have a fixed number of SAD comparisons per pixel. That is:

$$\text{SearchRange\_w} = a * BlkW$$

$$\text{SearchRange\_h} = a * BlkH$$

where 'α' is a constant integer value that controls the gain/complexity trade-off. In practice, 'α' is equal to 5.

ITMP mode is enabled for blocks with size less than or equal to a maximum size of 64 in width and height. This maximum size is configurable.

ITMP mode is signaled as prediction information at CU level through a dedicated flag for current block.

The problem solved by this disclosure is to improve the compression performance of ECM and VVC, particularly in the case where both the IBC and ITMP prediction modes are enabled in a same video picture.

In the existing prior art, the ITMP or IBC prediction modes can be used to predict blocks of a slice of a video picture. However, they are used separately, and no interaction between the two prediction modes exists.

At least one exemplary embodiment of the present application has been devised with the foregoing in mind.

At least one of the aspects generally relates to video picture encoding and decoding, one other aspect generally relates to transmitting a bitstream provided or encoded and one other aspects relates to receiving/accessing a decoded bitstream.

At least one of the exemplary embodiments is described for encoding/decoding a video picture but extends to the encoding/decoding of video pictures (sequences of pictures) because each video picture is sequentially encoded/decoded as described below.

Moreover, the at least one exemplary embodiments are not limited to the current version of VVC. The at least one exemplary embodiment may apply to pre-existing or future-developed, and extensions of VVC and recommendations. Unless indicated otherwise, or technically precluded, the aspects described in the present application may be used individually or in combination.

A pixel corresponds to the smallest display unit on a screen, which can be composed of one or more sources of light (1 for monochrome screen or 3 or more for colour screens).

A video picture, also denoted frame or picture frame, comprises at least one component (also called picture component, or channel) determined by a specific picture/video format which specifies all information relative to pixel values and all information which may be used by a display unit and/or any other device to display and/or to decode video picture data related to said video picture.

A video picture comprises at least one component usually expressed in the shape of an array of samples.

A monochrome video picture comprises a single component and a color video picture may comprise three components.

For example, a color video picture may comprise a luma (or luminance) component and two chroma components when the picture/video format is the well-known (Y,Cb,Cr) format or may comprise three color components (one for Red, one for Green and one for Blue) when the picture/video format is the well-known (R,G,B) format.

Each component of a video picture may comprise a number of samples relative to a number of pixels of a screen on which the video picture is intended to be display. In variants, the number of samples comprised in a component may be a multiple (or fraction) of a number of samples comprised in another component of a same video picture.

For example, in the case of a video format comprising a luma component and two chroma component like the (Y,Cb, Cr) format, dependent on the color format considered, the chroma component may contain half the number of samples in width and/or height, relative to the luma component.

A sample is the smallest visual information unit of a component composing a video picture. A sample value may be, for example a luma or chroma value or a colour value of a (R, G, B) format.

A pixel value is the value of a pixel of a screen. A pixel value may be represented by one sample for monochrome video picture and by multiple co-located samples for color video picture. Co-located samples associated with a pixel mean samples corresponding to the location of a pixel in the screen.

It is common to consider a video picture as being a set of pixel values, each pixel being represented by at least one sample.

A block of a video picture is a set of samples of one component of the video picture. A block of at least one luma sample or a block of at least one chroma sample may be considered when the picture/video format is the well-known (Y,Cb,Cr) format, or a block of at least one color sample when the picture/video format is the well-known (R, G, B) format.

The at least one exemplary embodiment is not limited to a particular picture/video format.

Generally speaking, as discussed above in relation with prior art, when a current block (coding unit or prediction unit) of a video picture is predicted with ITMP mode, a L-shaped templated-based search for a best prediction block of the current block is searched in an already coded, decoded and reconstructed area of the video picture.

The present disclosure also determines a first block vector between the current block and the best prediction block.

Compared to prior art, the present disclosure converts the difference of spatial positions between the best prediction block and the current block to a block vector linking the two blocks, i.e. the block vector represents the displacement between the current block and the best prediction block.

The present disclosure provides interactions between ITMP and IBC prediction modes (IBC-skip/merge mode or IBC-AMVP mode) because block vectors of neighbouring blocks of a current block to be predicted that have been already predicted by using either an IBC prediction or ITMP mode, may be used for predicting a block vector determined for the current block by using an IBC prediction mode.

Said block vectors of neighbouring blocks can then be re-used and spatially propagated towards subsequent blocks to be predicted in the video picture. This way, the IBC prediction mode may then potentially benefit from the block vector information issued from the ITMP mode.

This leads to a more efficient signalling of the block vector information in the case of the IBC prediction mode, i.e. it reduces the bitrate cost used to signal block vector information in IBC predicted blocks.

As a result, the overall coding efficiency of a video picture is increased.

Figure 11:
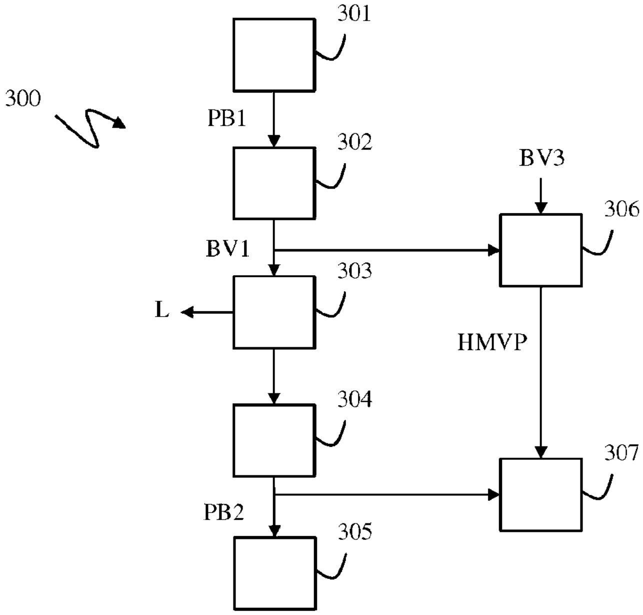
FIG. 11 shows schematically a block diagram of a method 300 of predicting a block of a video picture in accordance with exemplary embodiments.

FIG. 11 shows schematically a block diagram of a method 300 of predicting a block of a video picture in accordance with exemplary embodiments.

Method 300 provides a predicted block of the block of the video picture. This predicted block may be used in the selection of a prediction mode of method 100 or used as a prediction mode of the prediction process of method 200.

Prediction information relative to method 300 is signaled, i.e. said prediction information is written into a bitstream when method 300 is used in method 100 and is parsed from a bitstream when method 300 is used in method 200.

In step 301, a first prediction block PB1 is derived from an ITMP mode as discussed in the introducing part. Basically, ITMP mode determines the first prediction block PB1 by minimizing a cost function calculated between sample values of a L-shaped template of the block of the video picture (to be predicted) and a L-shaped template of a reconstructed block of the video picture.

Figure 12:
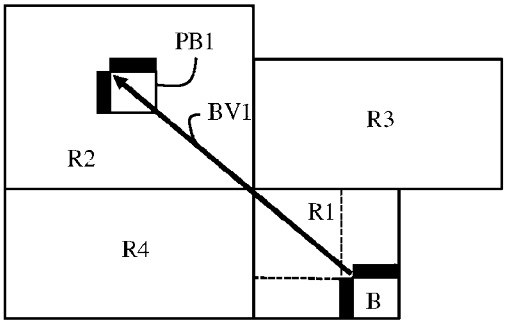
FIG. 12 shows schematically an example of a first block vector linking two blocks in accordance with exemplary embodiments.

In step 302, as illustrated on FIG. 12, a first block vector BV1 is determined as a displacement between the first prediction block PB1 and the block B of the video picture, said first block vector BV1 identifying the first prediction block as a prediction block candidate of the block of the video picture.

The block B of FIG. 12 is predicted by the best prediction block PB1 derived from the ITMP mode as discussed in the introducing part. Basically, the first prediction block PB1 is searched by minimizing a cost function calculated between sample values of a L-shaped template of the block B and a L-shaped template of a reconstructed block of the video picture. The block vector BV1 is derived as the displacement in the video picture between the block B and the best prediction block PB1:

$$BV1=(px-x,py-y)$$

where (px,py) is the spatial position of the first prediction block PB1 and (x,y) is the spatial position of the block B.

In one exemplary embodiment, the first block vector BV1 may be stored in a block-based buffer of motion information.

In a variant, the first block vector BV1 is stored on a N×M subblock basis.

For example, N=M=4.

Figure 13:
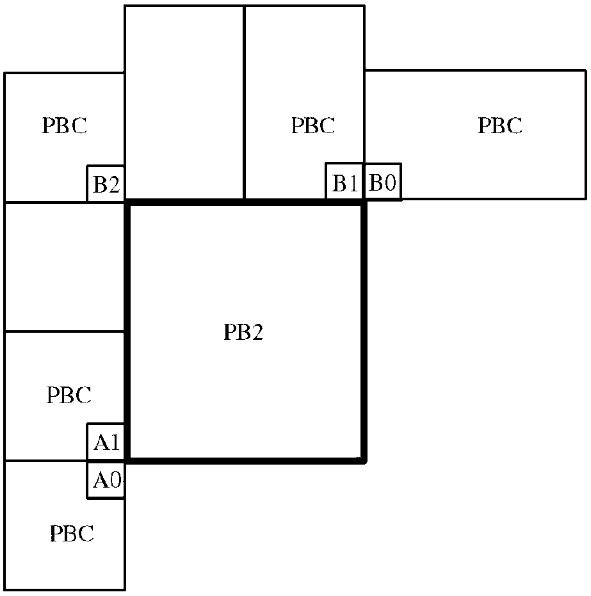
FIG. 13 shows schematically an example of subblocks of neighbouring blocks in accordance with exemplary embodiments.

For example, the first block BV1 is stored on subblocks associated with neighboring blocks PBC of a block PB2 as shown on FIG. 13. In this example, neighboring blocks with subblocks A0, A1, B0 B1 and B2 may be predicted by predicted blocks determined by either ITMP or IBC prediction modes and the block vectors associated with these IBC or ITMP-based predicted blocks are stored in association with these subblocks.

In one exemplary embodiment, in step 303, the first block vector BV1 is added in a list L of block vector prediction candidates associated with the video picture.

The list L of block vector prediction candidates may thus comprise block vectors associated with predicted block candidates derived from IBC-skip/merge mode or IBC-AMBP mode or ITMP mode.

In a variant of the exemplary embodiment, in step 304, the block of the video picture is predicted by the second prediction block PB2. The second prediction block PB2 is derived from an IBC prediction mode as discussed in the introducing part. Basically, IBC prediction mode determines, by block matching, the second block vector BV2 as a displacement between the block of the video picture and a reference block of a reconstructed area of the video picture. In step 305, the second block vector BV2 is predicted by a block vector BV3 of the list L of block vector prediction candidates.

The difference between the second block vector BV2 and the block vector BV3 is signaled as prediction information.

According to this exemplary embodiment and variant, the second block vector BV2 may be predicted by a block vector BV3 associated with an IBC or ITMP predicted block.

Figure 14:
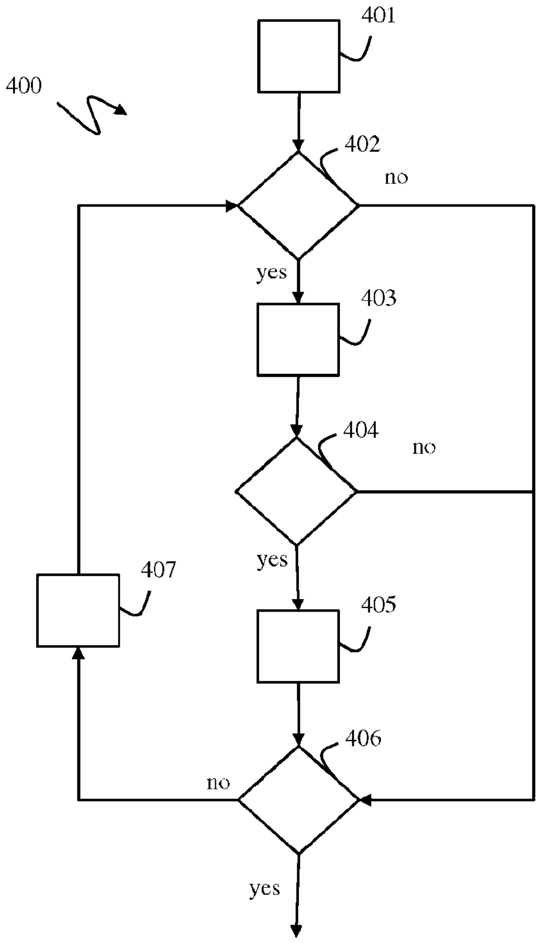
FIG. 14 shows schematically a block diagram of a method 400 to construct a list of block vector prediction candidates for predicting a second block vector BV2 in accordance with exemplary embodiments.

FIG. 14 shows schematically a block diagram of a method 400 to construct the list L of block vector prediction candidates for predicting a second block vector BV2 in accordance with exemplary embodiments.

In brief, method 400 consists in a loop on several spatial positions around the second prediction block PB2 where at each iteration, it is evaluated if some block vector candidate BV3 is available as a potential candidate to predict the second block vector BV2.

In step 401, a spatial position of a prediction block candidate PB3 around the second prediction block PB2 is considered.

In step 402, method 400 checked if the prediction block candidate PB3 is associated with a block vector determined from either an IBC or ITMP prediction mode.

If not, a spatial position of a new prediction block candidate PB3 around the second prediction block PB2 is considered.

If yes, step 402 is followed by step 403-405.

In step 403, the block vector candidate BV3 associated with the considered prediction block PB3 is obtained from the block-based buffer of motion information.

In step 404, method 400 checks whether the block vector candidate BV3 is valid as an IBC block vector for the second block vector BV2, i.e. whether a spatial propagation of the block vector BV3 is allowed to predict the second block vector BV2.

A block vector BV3 is considered as being valid as an IBC block vector for the second block vector BV2 when a block pointed by the block vector BV3 is inside the already reconstructed area of the video picture and complies to some pred-defined ranges of allowed values of the block vector components.

If not, step 404 is followed by step 406.

I yes, in step 405, the block vector BV3 is added to the list L of block vector prediction candidates.

In step 406, method 400 checks if position of all prediction block candidates PB3 around the second prediction block PB2 have been considered.

If yes, method 400 ends.

If not, step 406 is followed by step 407 in which a spatial position of a new prediction block candidate PB3 around the second prediction block PB2 is considered. Step 406 is followed by step 402.

In one exemplary embodiment, in step 306, the first block vector BV1 is stored in an history-based-motion vector prediction table HMVP.

In a variant, the table HMVP also stores at least one third block vector BV3 associated with at least one prediction block of at least one reconstructed area of the video picture, each of said at least one third block vector BV3 being derived from an IBC prediction mode.

The HMVP table is enriched compared to the prior art, and better block vector predictor candidates are obtained to predict subsequent IBC predicted blocks with the HMVP block vector propagation mechanism of ECM.

In a variant, when the block of the video picture is predicted by the second prediction block PB2, in step 307, the second block vector PB2 is predicted by a block vector BV4 of the table HMVP.

In a variant of the method 400 of FIG. 14, some block vector prediction candidate stored in the HMVP table may be added to the list L of block vector prediction candidates constructed by method 400.

Figure 15:
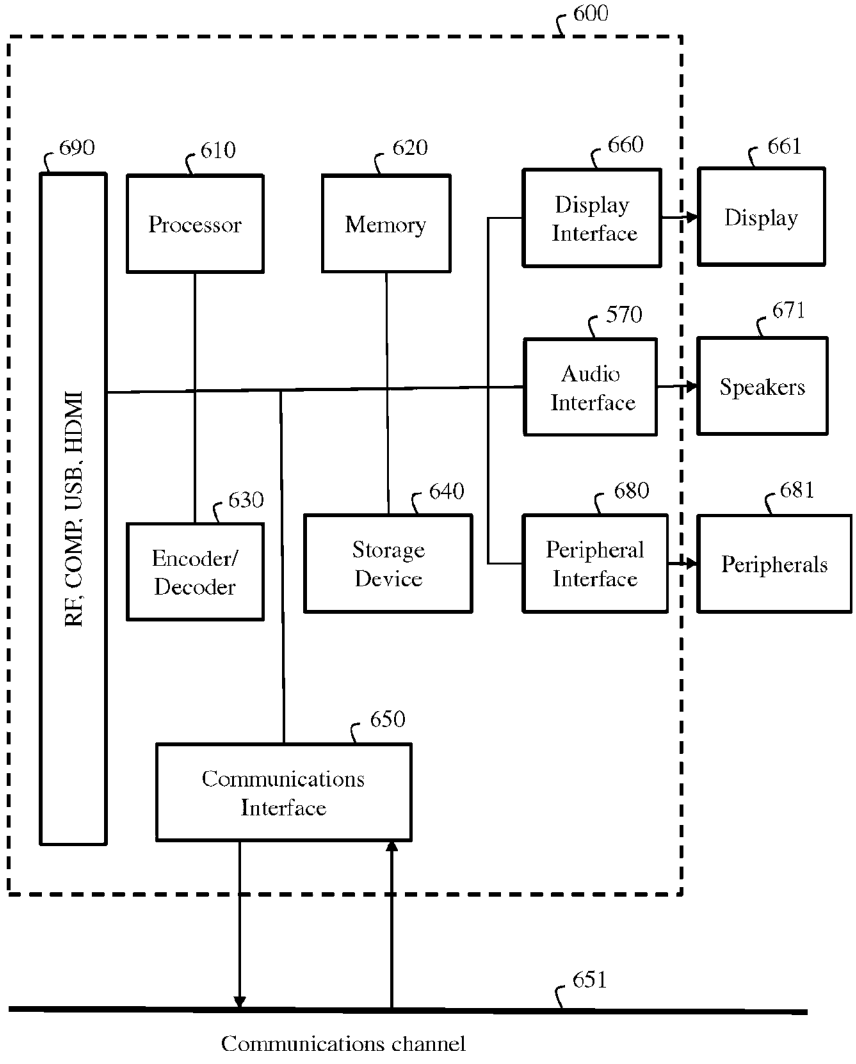
FIG. 15 illustrates a schematic block diagram of an example of a system in which various aspects and exemplary embodiments are implemented. Similar or same elements are referenced with the same reference numbers.

FIG. 15 shows a schematic block diagram illustrating an example of a system 600 in which various aspects and exemplary embodiments are implemented.

System 600 may be embedded as one or more devices including the various components described below. In various exemplary embodiments, system 600 may be configured to implement one or more of the aspects described in the present application.

Examples of equipment that may form all or part of the system 600 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, video servers (e.g. a broadcast server, a video-on-demand server or a web server), still or video camera, encoding or decoding chip or any other communication devices. Elements of system 600, singly or in combination, may be embodied in a single integrated circuit (IC), multiple ICs, and/or discrete components. For example, in at least one exemplary embodiment, the processing and encoder/decoder elements of system 600 may be distributed across multiple ICs and/or discrete components. In various exemplary embodiments, system 600 may be communicatively coupled to other similar systems, or to other electronic devices, via, for example, a communications bus or through dedicated input and/or output ports.

System 600 may include at least one processor 610 configured to execute instructions loaded therein for implementing, for example, the various aspects described in the present application. Processor 610 may include embedded memory, input output interface, and various other circuitries as known in the art. System 600 may include at least one memory 620 (for example a volatile memory device and/or a non-volatile memory device). System 600 may include a storage device 640, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive.

The storage device 640 may include an internal storage device, an attached storage device, and/or a network accessible storage device, as non-limiting examples.

System 600 may include an encoder/decoder module 630 configured, for example, to process data to provide encoded/decoded video picture data, and the encoder/decoder module 630 may include its own processor and memory. The encoder/decoder module 630 may represent module(s) that may be included in a device to perform the encoding and/or decoding functions. As is known, a device may include one or both encoding and decoding modules. Additionally, encoder/decoder module 630 may be implemented as a separate element of system 600 or may be incorporated within processor 610 as a combination of hardware and software as known to those skilled in the art.

Program code to be loaded onto processor 610 or encoder/decoder 630 to perform the various aspects described in the present application may be stored in storage device 640 and subsequently loaded onto memory 620 for execution by processor 610. In accordance with various exemplary embodiments, one or more of processor 610, memory 620, storage device 640, and encoder/decoder module 630 may store one or more of various items during the performance of the processes described in the present application. Such stored items may include, but are not limited to video picture data, information data used for encoding/decoding video picture data, a bitstream, matrices, variables, and intermediate or final results from the processing of equations, formulas, operations, and operational logic.

In several exemplary embodiments, memory inside of the processor 610 and/or the encoder/decoder module 630 may be used to store instructions and to provide working memory for processing that may be performed during encoding or decoding.

In other exemplary embodiments, however, a memory external to the processing device (for example, the processing device may be either the processor 610 or the encoder/decoder module 630) may be used for one or more of these functions. The external memory may be the memory 620 and/or the storage device 640, for example, a dynamic volatile memory and/or a non-volatile flash memory. In several exemplary embodiments, an external non-volatile flash memory may be used to store the operating system of a television. In at least one exemplary embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), AVC, HEVC, EVC, VVC, AV1, etc.

The input to the elements of system 600 may be provided through various input devices as indicated in block 690. Such input devices include, but are not limited to, (i) an RF portion that may receive an RF signal transmitted, for example, over the air by a broadcaster, (ii) a Composite input terminal, (iii) a USB input terminal, (iv) an HDMI input terminal, (v) a bus such as CAN (Controller Area Network), CAN FD (Controller Area Network Flexible Data-Rate), FlexRay (ISO 17458) or Ethernet (ISO/IEC 802-3) bus when the present disclosure is implemented in the automotive domain.

In various exemplary embodiments, the input devices of block 690 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain exemplary embodiments, (iv) demodulating the down-converted and band-limited signal, (v) performing error correction, and (vi) demultiplexing to select the desired stream of data packets. The RF portion of various exemplary embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various exemplary embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various exemplary embodiments, the RF portion may include an antenna.

Additionally, the USB and/or HDMI terminals may include respective interface processors for connecting system 600 to other electronic devices across USB and/or HDMI connections. It is to be understood that various aspects of input processing, for example, Reed-Solomon error correction, may be implemented, for example, within a separate input processing IC or within processor 610 as necessary. Similarly, aspects of USB or HDMI interface processing may be implemented within separate interface ICs or within processor 610 as necessary. The demodulated, error corrected, and demultiplexed stream may be provided to various processing elements, including, for example, processor 610, and encoder/decoder 630 operating in combination with the memory and storage elements to process the data stream as necessary for presentation on an output device.

Various elements of system 600 may be provided within an integrated housing. Within the integrated housing, the various elements may be interconnected and transmit data therebetween using suitable connection arrangement 690, for example, an internal bus as known in the art, including the I2C bus, wiring, and printed circuit boards.

The system 600 may include communication interface 650 that enables communication with other devices via communication channel 651. The communication interface 650 may include, but is not limited to, a transceiver configured to transmit and to receive data over communication channel 651. The communication interface 650 may include, but is not limited to, a modem or network card and the communication channel 651 may be implemented, for example, within a wired and/or a wireless medium.

Data may be streamed to system 600, in various exemplary embodiments, using a Wi-Fi network such as IEEE 802.11. The Wi-Fi signal of these exemplary embodiments may be received over the communications channel 651 and the communications interface 650 which are adapted for Wi-Fi communications. The communications channel 651 of these exemplary embodiments may be typically connected to an access point or router that provides access to outside networks including the Internet for allowing streaming applications and other over-the-top communications.

Other exemplary embodiments may provide streamed data to the system 600 using a set-top box that delivers the data over the HDMI connection of the input block 690.

Still other exemplary embodiments may provide streamed data to the system 600 using the RF connection of the input block 690.

The streamed data may be used as a way for signaling information used by the system 600. The signaling information may comprise the bitstream B and/or information such a number of pixels of a video picture and/or any coding/decoding setup parameters.

It is to be appreciated that signaling may be accomplished in a variety of ways. For example, one or more syntax elements, flags, and so forth may be used to signal information to a corresponding decoder in various exemplary embodiments.

System 600 may provide an output signal to various output devices, including a display 661, speakers 671, and other peripheral devices 681. The other peripheral devices 681 may include, in various examples of exemplary embodiments, one or more of a stand-alone DVR, a disk player, a stereo system, a lighting system, and other devices that provide a function based on the output of system 600.

In various exemplary embodiments, control signals may be communicated between the system 600 and the display 661, speakers 671, or other peripheral devices 681 using signaling such as AV.Link (Audio/Video Link), CEC (Consumer Electronics Control), or other communications protocols that enable device-to-device control with or without user intervention.

The output devices may be communicatively coupled to system 600 via dedicated connections through respective interfaces 660, 670, and 680.

Alternatively, the output devices may be connected to system 600 using the communications channel 651 via the communications interface 650. The display 661 and speakers 671 may be integrated in a single unit with the other components of system 600 in an electronic device such as, for example, a television.

In various exemplary embodiments, the display interface 660 may include a display driver, such as, for example, a timing controller (T Con) chip.

The display 661 and speaker 671 may alternatively be separate from one or more of the other components, for example, if the RF portion of input 690 is part of a separate set-top box. In various exemplary embodiments in which the display 661 and speakers 671 may be external components, the output signal may be provided via dedicated output connections, including, for example, HDMI ports, USB ports, or COMP outputs.

In FIGS. 1-15, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present exemplary embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing video pictures or other communication devices. As should be clear, the equipment may be mobile and even installed in a mobile vehicle.

Computer software may be implemented by the processor 610 or by hardware, or by a combination of hardware and software. As a non-limiting example, the exemplary embodiments may be also implemented by one or more integrated circuits. The memory 620 may be of any type appropriate to the technical environment and may be implemented using any appropriate data storage technology, such as optical memory devices, magnetic memory devices, semiconductor-based memory devices, fixed memory, and removable memory, as non-limiting examples. The processor 610 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. —For example, a signal may be formatted to carry the bitstream of a described exemplary embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular exemplary embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" or "associated with" to another element, it may be directly responsive or connected to or associated with the other element, or intervening elements may be present. In contrast, when an element is referred to as being "directly responsive" or "directly connected" to or "directly associated with" other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the exemplary embodiment/implementation) is included in at least one exemplary embodiment/implementation. Thus, the appearances of the phrase "in one exemplary embodiment" or "in an exemplary embodiment" or "in one implementation" or "in an implementation", as well any other variations, appearing in various places throughout the present application are not necessarily all referring to the same exemplary embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the present application are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present exemplary embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received video picture (including possibly a received bitstream which encodes one or more video picture) in order to produce a final output suitable for display or for further processing in the reconstructed video domain. In various exemplary embodiments, such processes include one or more of the processes typically performed by a decoder. In various exemplary embodiments, such processes also, or alternatively, include processes performed by a decoder of various implementations described in the present application, for example, As further examples, in one exemplary embodiment "decoding" may refer only to de-quantizing, in one exemplary embodiment "decoding" may refer to entropy decoding, in another exemplary embodiment "decoding" may refer only to differential decoding, and in another exemplary embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific description and is believed to be well understood by those skilled in the art.

Various implementations involve encoding. In an analogous way to the above discussion about "decoding", "encoding" as used in the present application may encompass all or part of the processes performed, for example, on an input video picture in order to produce an output bitstream. In various exemplary embodiments, such processes include one or more of the processes typically performed by an encoder. In various exemplary embodiments, such processes also, or alternatively, include processes performed by an encoder of various implementations described in this application.

As further examples, in one exemplary embodiment "encoding" may refer only to quantizing, in one exemplary embodiment "encoding" may refer only to entropy encoding, in another exemplary embodiment "encoding" may refer only to differential encoding, and in another exemplary embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, the present application may refer to "obtaining" various pieces of information. Obtaining the information may include one or more of, for example, estimating the information, calculating the information, predicting the information, or retrieving the information from memory, processing the information, moving the information, copying the information, erasing the information, calculating the information, determining the information, predicting the information, or estimating the information.

Additionally, this application may refer to "receiving" various pieces of information. Receiving the information may include one or more of, for example, accessing the information, or receiving information from a communication network.

Also, as used herein, the word "signal" refers to, among other things, indicating something to a corresponding decoder. For example, in certain exemplary embodiments the encoder signals a particular information such as coding parameter or encoded video picture data. In this way, in an exemplary embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various exemplary embodiments. It is to be appreciated that signaling may be accomplished in a variety of ways. For example, one or more syntax elements, flags, and so forth are used to signal information to a corresponding decoder in various exemplary embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of predicting a block of a video picture, comprising:

deriving a first prediction block from an intra-template-matching prediction mode determining the first prediction block by minimizing a cost function calculated between sample values of a L-shaped template of the block of the video picture and a L-shaped template of a reconstructed block of the video picture; and determining a first block vector as a displacement between the first prediction block and the block of the video picture, the first block vector identifying the first prediction block as a prediction block candidate of the block of the video picture.

2. The method of claim 1, wherein the first block vector is stored in a block-based buffer of motion information.

3. The method of claim 2, wherein the first block vector is stored on subblock basis.

4. The method of claim 1, further comprising:

adding the first block vector to a list of block vector prediction candidates associated with the video picture.

5. The method of claim 4, the block of the video picture being predicted by a second prediction block, the second prediction block being derived from an intra-block-copy prediction mode determining, by block matching, a second block vector as a displacement between the block of the video picture and a prediction block of a reconstructed area of the video picture, wherein the method further comprises:

predicting the second block vector by a block vector of the list of block vector prediction candidates.

6. The method of claim 1, further comprising:

storing the first block vector in a history-based-motion vector prediction table.

7. The method of claim 6, wherein the history-based-motion vector prediction table further stores at least one third block vector associated with at least one prediction block of at least one reconstructed block of the video picture, each of the at least one third block vector being derived from an intra-block-copy prediction mode determining, by block matching, the third block vector as a displacement between a prediction block of a reconstructed area of the video picture and a reference block of the video picture.

8. The method of claim 7, wherein the block of the video picture is predicted by a second prediction block, the second prediction block being derived from an intra-block-copy prediction mode determining, by block matching, a second block vector as a displacement between the block of the video picture and a prediction block of a reconstructed area of the video picture, wherein the method further comprises:

predicting the second block vector by a block vector of the history-based-motion vector prediction table.

9. The method of claim 1, further comprising:

encoding or decoding the block of the video picture based on a predicted block.

10. An apparatus of predicting a block of a video picture, comprising:

a processor; and a memory storing instructions executable by the processor, wherein the processor is configured to:

derive a first prediction block from an intra-template-matching prediction mode determining the first prediction block by minimizing a cost function calculated between sample values of a L-shaped template of the block of the video picture and a L-shaped template of a reconstructed block of the video picture; and determine a first block vector as a displacement between the first prediction block and the block of the video picture, the first block vector identifying the first prediction block as a prediction block candidate of the block of the video picture.

11. The apparatus of claim 10, wherein the first block vector is stored in a block-based buffer of motion information.

12. The apparatus of claim 11, wherein the first block vector is stored on subblock basis.

13. The apparatus of claim 10, wherein the processor is further configured to:

add the first block vector to a list of block vector prediction candidates associated with the video picture.

14. The apparatus of claim 10, the block of the video picture being predicted by a second prediction block, the second prediction block being derived from an intra-block-copy prediction mode determining, by block matching, a second block vector as a displacement between the block of the video picture and a prediction block of a reconstructed area of the video picture, wherein the processor is further configured to:

predict the second block vector by a block vector of a list of block vector prediction candidates.

15. The apparatus of claim 10, wherein the processor is further configured to:

store the first block vector in a history-based-motion vector prediction table.

16. The apparatus of claim 15, wherein the history-based-motion vector prediction table further stores at least one third block vector associated with at least one prediction block of at least one reconstructed block of the video picture, each of the at least one third block vector being derived from an intra-block-copy prediction mode determining, by block matching, the third block vector as a displacement between a prediction block of a reconstructed area of the video picture and a reference block of the video picture.

17. The apparatus of claim 16, wherein the block of the video picture is predicted by a second prediction block, the second prediction block being derived from an intra-block-copy prediction mode determining, by block matching, a second block vector as a displacement between the block of the video picture and a prediction block of a reconstructed area of the video picture, wherein the processor is further configured to:

predict the second block vector by a block vector of the history-based-motion vector prediction table.

18. The apparatus of claim 10, wherein the processor is further configured to:

encode or decode the block of the video picture based on the predicted block.

19. A non-transitory storage medium storing instructions of program code for executing a method of predicting a block of a video picture, the method comprising:

deriving a first prediction block from an intra-template-matching prediction mode determining the first prediction block by minimizing a cost function calculated between sample values of a L-shaped template of the block of the video picture and a L-shaped template of a reconstructed block of the video picture; and determining a first block vector as a displacement between the first prediction block and the block of the video picture, the first block vector identifying the first prediction block as a prediction block candidate of the block of the video picture.

* * * * *